United States Patent
Yamaguchi et al.

(10) Patent No.: US 7,002,548 B2
(45) Date of Patent: Feb. 21, 2006

(54) DRIVE CONTROLLER AND CONTROL METHOD

(75) Inventors: Takamasa Yamaguchi, Saitama (JP); Hitoshi Sato, Saitama (JP); Yukari Mizumura, Saitama (JP); Rie Yamashita, Saitama (JP); Hidetsugu Kubota, Saitama (JP); Toshiyuki Murata, Saitama (JP)

(73) Assignee: Pioneer Corporation, Tokyo (JP)

( * ) Notice: Subject to any disclaimer, the term of this patent is extended or adjusted under 35 U.S.C. 154(b) by 338 days.

(21) Appl. No.: 10/328,033

(22) Filed: Dec. 26, 2002

(65) Prior Publication Data

US 2003/0122782 A1    Jul. 3, 2003

(30) Foreign Application Priority Data

Dec. 28, 2001    (JP)    ............................ P.2001-401690
Nov. 22, 2002    (JP)    ............................ P.2002-338686

(51) Int. Cl.
G09G 3/34    (2006.01)
(52) U.S. Cl. ...................... 345/110; 345/108; 701/200; 340/988
(58) Field of Classification Search ................ 345/108, 345/110, 158, 204; 701/200, 211; 340/980, 340/988, 990, 995
See application file for complete search history.

(56) References Cited

U.S. PATENT DOCUMENTS

| 4,908,611 | A | * | 3/1990 | Iino | ............................... 345/7 |
| 5,736,827 | A | * | 4/1998 | Dohnal et al. | .............. 318/696 |
| 6,181,996 | B1 | * | 1/2001 | Chou et al. | ................... 701/36 |
| 6,281,804 | B1 | | 8/2001 | Haller et al. | |
| 6,325,436 | B1 | | 12/2001 | Ehrenberger et al. | ...... 296/24.1 |

FOREIGN PATENT DOCUMENTS

| EP | 0 338 405 A2 | 10/1989 |
| EP | 1 020 329 A1 | 7/2000 |
| JP | 60-179357 | 9/1985 |
| JP | 2001-30839 A | 2/2002 |

* cited by examiner

Primary Examiner—Dennis-Doon Chow
Assistant Examiner—Tom Sheng
(74) Attorney, Agent, or Firm—Morgan, Lewis & Bockius LLP

(57) ABSTRACT

A drive controller for controlling to change the orientation of a display surface of a display in accordance with the seating position of occupants aboard a vehicle. A display unit is rotatably mounted on a vehicle. A controller automatically rotates the display unit to a first position where the display surface is oriented toward a driver seat, when an occupant is seated solely in the driver seat. The controller rotates the display unit to a third position where the display surface is oriented toward a front passenger seat, when an occupant is seated solely in the front passenger seat. The controller rotates the display unit to a second position where the display surface is oriented toward the middle point between the driver seat and the front passenger seat, on detecting both of the occupants are seated respectively in the driver seat and the front passenger seat.

4 Claims, 4 Drawing Sheets

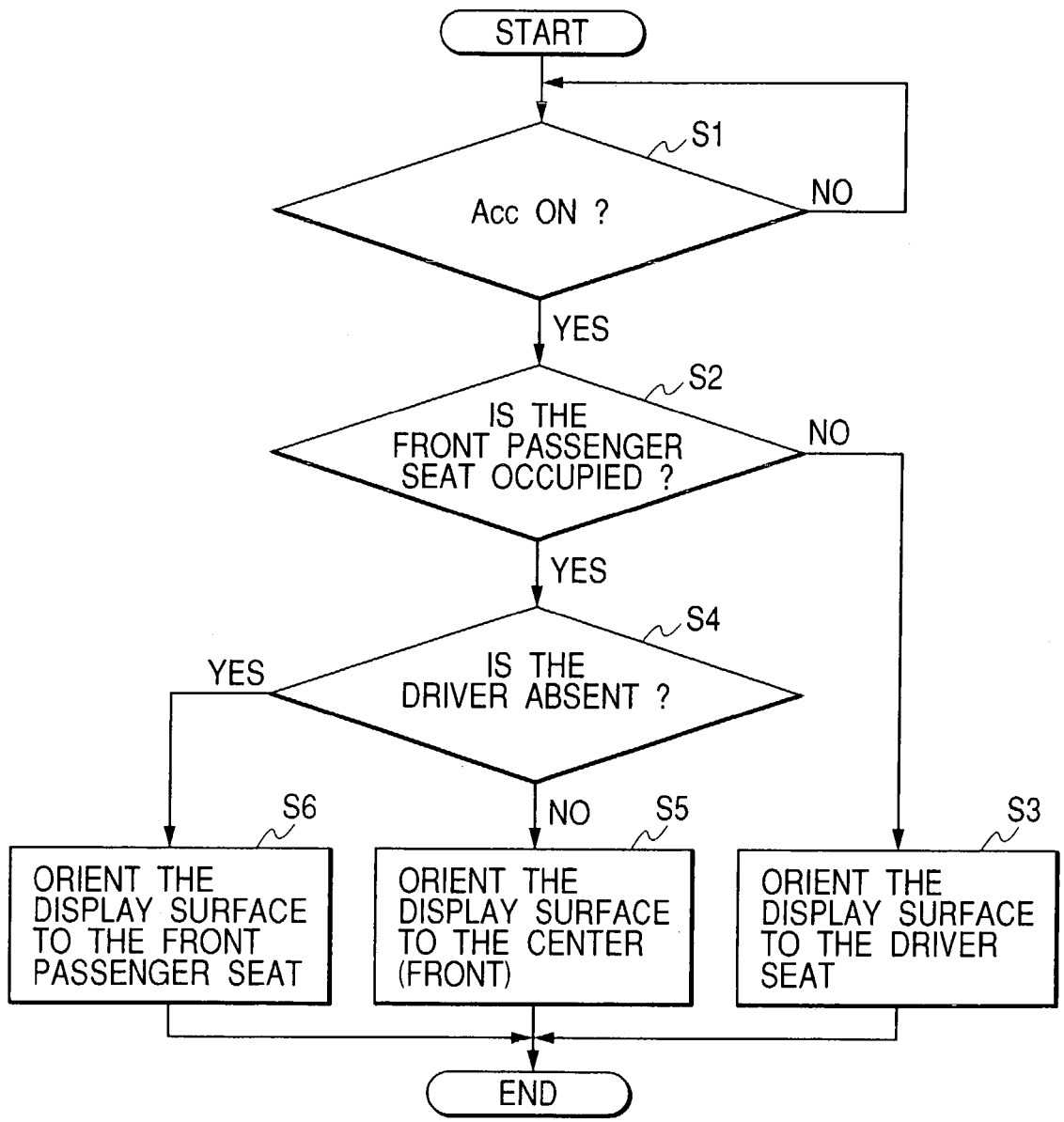

DRIVE CONTROLLER AND CONTROL METHOD

The present disclosure relates to the subject matter contained in Japanese Patent Application No. 2001-401690 filed Dec. 28, 2001, which is incorporated herein by reference in its entirety.

BACKGROUND OF THE INVENTION

1. Field of the Invention

The present invention relates to a drive controller and a control method for controlling to change the orientation of a display surface of display means rotatably mounted on a vehicle.

2. Background Art

A related art drive controller is known, as described in the Japanese Patent Laid-Open No. 2001-30839, where an occupant of a vehicle operates a switch provided on a display unit to orient the display surface of the display unit in the direction desired by the occupant.

To orient a display face of a display unit toward an occupant seated in a driver seat, the display surface oriented toward an occupant seated in a front passenger seat, either occupant operates the switch to attain the purpose.

According to the related art drive controller, with the display surface of the display unit oriented toward an occupant seated in the front passenger seat, an occupant seated in the driver seat must operate the switch to watch map information on a car navigation system while driving a vehicle. The line of sight of the occupant is turned from the traveling direction of the vehicle in this operation, which could disturb the driving operation.

SUMMARY OF THE INVENTION

The invention has been proposed in view of the aforementioned situation and aims at providing a drive controller and a control method that can automatically change the orientation of a display surface of display means in accordance with the seated position(s) of one or a plurality of occupants of a vehicle.

The invention provides a drive controller, which includes: a display, mounted on a vehicle, having a display surface; a drive device for driving the display to change the orientation of the display surface; a seating position detector for detecting seating position of one or more occupants aboard the vehicle; and a controller for controlling the drive device so as to orient the display surface in accordance with the seating position of the one or more occupants.

According to the invention, the seating position detector is capable of detecting seating of the occupant in a driver seat and a front passenger seat respectively. The drive device is capable of driving the display to a first position, a second position and a third position. In the first position, the display surface is oriented toward the occupant seated in the driver seat. In the second position, the display surface is oriented toward both of the occupants seated in the driver seat and the front passenger seat. In the third position, the display surface is oriented toward the occupant seated in the front passenger seat. The controller controls the drive device to drive the display to the first position when the seating position detector detects seating of the occupant in the driver seat and does not detect seating of the occupant in the front passenger seat. The controller controls the drive device to drive the display to the second position when the seating position detector detects seating of the occupants both in the driver seat and in the front passenger seat. The controller controls the drive device to drive the display to the third position when seating position detector detects seating of the occupant in the front passenger seat and does not detect seating of the occupant in the driver seat.

The invention further provides a control method for controlling an orientation of a display surface of a display, which includes: detecting the seating position of one or more occupants aboard the vehicle; and controlling the orientation of a display surface of a display so as to orient the display surface towards the one or more occupants in accordance with the seating position of the one or more occupants.

BRIEF DESCRIPTION OF THE DRAWINGS

FIG. 4 is a flowchart showing the operation of the drive controller in the embodiment.

DETAILED DESCRIPTION OF THE PREFERRED EMBODIMENTS

Figure 1:
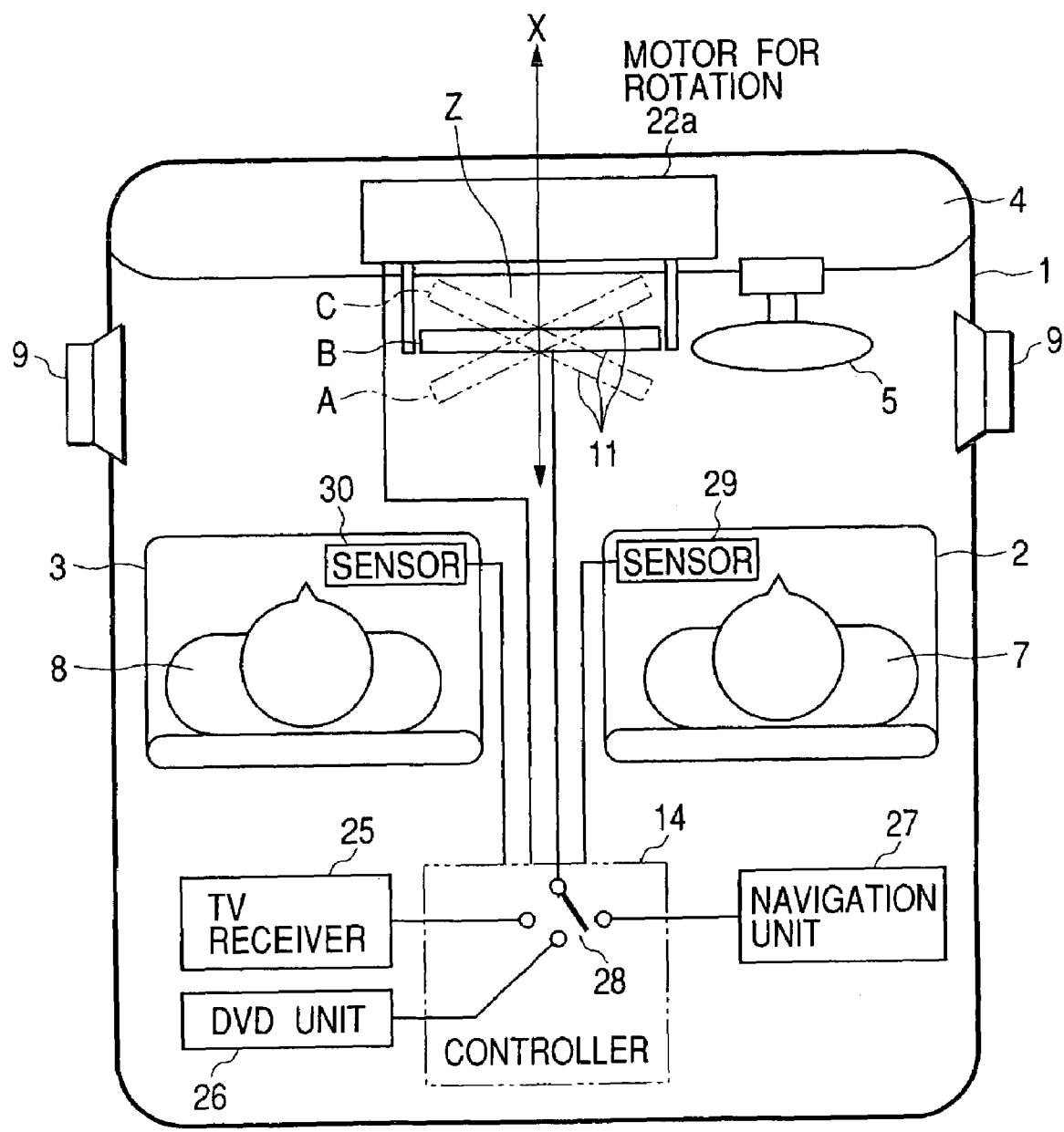
FIG. 1 is a schematic diagram showing the general configuration of a drive controller according to this embodiment.

An embodiment of the invention will be described referring to the drawings.

FIG. 1 is a schematic diagram showing the internal configuration of a vehicle mounting a drive controller according to this embodiment. In FIG. 1, a numeral 1 represents a vehicle. The vehicle 1 includes a driver seat 2 and a front passenger seat 3. Before the driver seat 2 and the front passenger seat 3 is provided a dashboard 4. On the dashboard 4 is provided a steering wheel 5 for steering the vehicle 1 before the driver seat 2. In the near proximity of the driver seat 2 and the front passenger seat 3 respectively is mounted a speaker 9, which amplifies and outputs the audio information supplied by a navigation unit 27 and a DVD (Digital Versatile Disc) unit 26. A numeral 7 represents an occupant is an occupant seated in the driver seat 2 and 8 an occupant seated in the front passenger seat 3.

In the approximate center of the dashboard 4 (before the center position of the driver seat 2 and front passenger seat 3) is arranged a display unit mounting section 12, to which a display unit 11 is rotatably mounted in the direction indicated by X in the figure. A controller 14 controls the operation of a drive unit 23 which drives a navigation unit 27, a DVD unit 26, TV receiver 25, and the display unit 11. On the controller 14 is provided a selector switch 28 which is changed over in accordance with the operation of a source selection button (not shown) provided on the display unit 11.

The navigation unit 27 includes a playback unit for playing back map information recorded onto a recording medium such as a CD-ROM, and a GPS receiver. The navigation unit 27 sends map information played back by the playback unit to the display unit 11. The DVD unit 26 is a playback unit for playing back image information and audio information recorded onto a DVD such as DVD-VIDEO. The DVD unit sends image information played back by the playback unit to the display unit 11 and sends audio information to the speaker 9. The TV receiver 25 received a TV wave, converts the TV wave to an image signal, and sends the image signal to the display unit 11. While the controller 14, navigation unit 27, TV receiver 25 and a DVD unit 26 are shown behind the driver seat 2 and the front passenger seat 3 in FIG. 1 for clarity, these are arranged in predetermined positions of the dashboard 4 in practice.

For each of the driver seat 2 and the front passenger seat 3, seats where occupants 7, 8 are seated comprise a sensor 29 for detecting an occupied driver seat as seating position detecting means and a sensor 30 for detecting an occupied front passenger seat as seating position detecting means. These seat occupation detecting sensors 29, 30 are composed of for example pressure sensors, and detects the seat occupation by detecting the level of a pressure applied when the occupants 7, 8 are seated. Each seat occupation detecting sensors 29, 30 sends signals indicating the occupants 7, 8 are seated to the controller 14.

Figure 2:
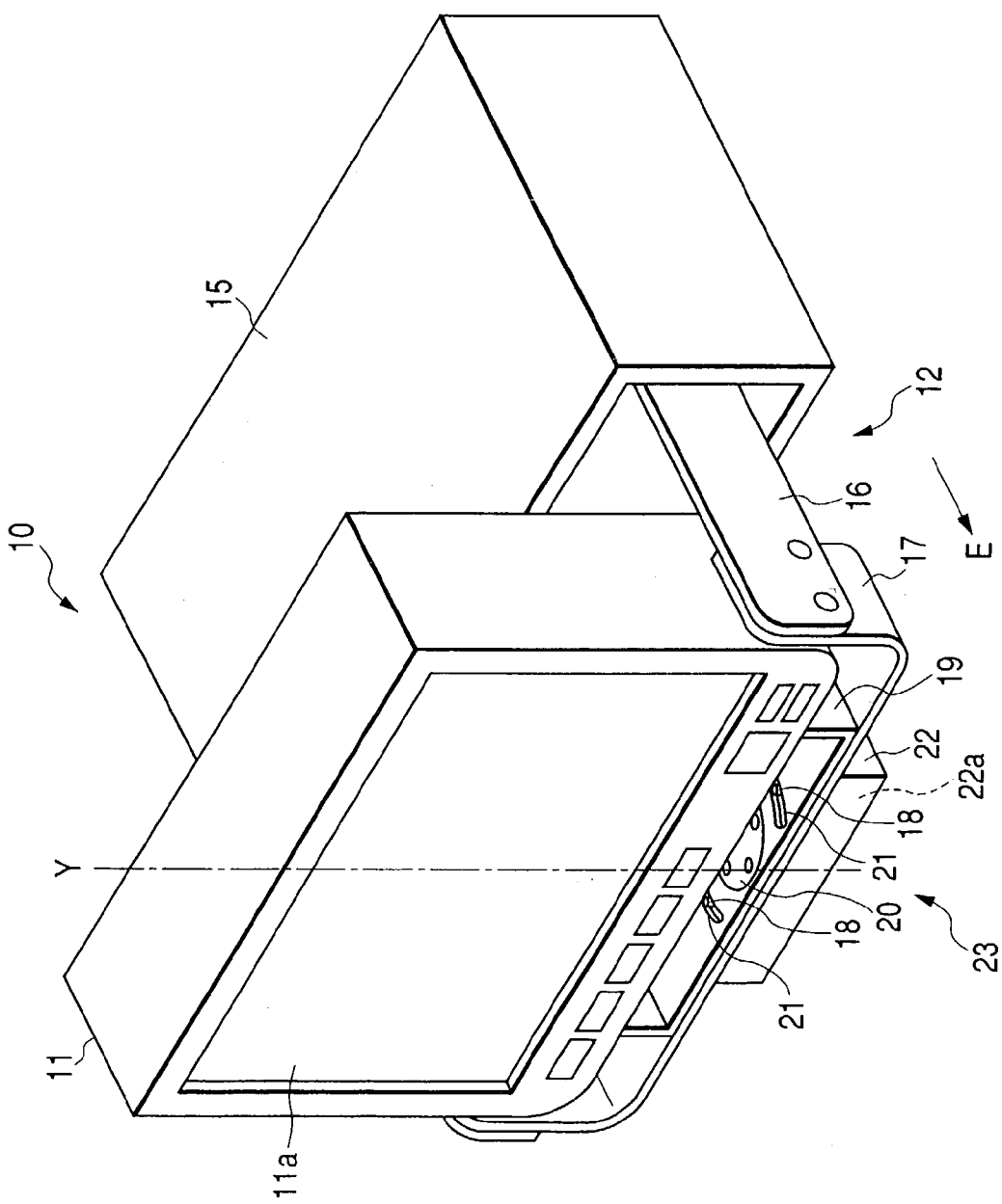
FIG. 2 is a perspective view of a drive controller according to the embodiment.

Next, a drive unit 23 for deriving the display unit 11 will be described referring to FIG. 2. First, the display unit mounting section 12 for mounting the display unit 11 will be described.

The display unit mounting section 12 includes a main body case 15 embedded into the dashboard 4, a pair of arms 16 extending in the direction of arrow E from the sides of the main body case 15, and pedestals 17 mounted on the tip of the pair of arms 16. The pedestal 17 is in the shape of an elongated plate, the ends of which in the longitudinal direction are erected upward. The erected sections are fixed to the pair of arms with nuts, and mounted to bridge across the arms 16. On the pedestal 17 are provided two guide pins 18, 18 which protrudes upward, and the guide pins 18, 18 are slidably engaged with two guide holes 21 formed in a rotary plate 19 mentioned later.

The drive unit 23 for driving the display unit 11 will be described. As shown in FIG. 2, the drive unit 23 includes a rotary plate 19 rotatably mounted on the pedestal 17 and a rotary box 22 accommodating a motor for rotation 22a for driving the rotary plate 19. The rotary plate 19 is slightly shorter than the longitudinal length of the pedestal 17 and has approximately the same shape as the pedestal 17. The tip of the erected section erected from the ends thereof in the longitudinal direction is bent along the bottom of the display unit 11. To the bend section is fixed the bottom of the display unit 11.

In the approximate center (on the center axis Y of the display unit 11) of the rotary plate 19 is located a mounting plate 20. A rotary plate 19 is rotatably mounted on the pedestal 17 so as to rotate about the mounting plate 20 as a pivot. On both sides of the mounting plate 20 are provided a pair of guide holes 21, 21 formed in the shape of arc and guide pins 18, 18 of the pedestal 17 are engaged slidably.

The rotary box 22 accommodates a motor for rotation 22a and a transmission member for transmitting the drive force of the motor for rotation 22a to a vertical drive axis (not shown), which extends from the mounting plate 20 into the rotary box 22. The transmission member is composed of a plurality of gear trains and transmits the drive force of the gear trains to the vertical drive axis depending on the rotation direction of the motor for rotation 22a. The motor for rotation 22a is driven by a power supplied using a flexible cable.

Between the rear surface of the display unit 11 mounted on the rotary plate 19 (surface opposite to the face where the display surface 11a is located) and the display unit mounting section 12 is formed a space area Z required for the display unit 11 to rotate. The space area Z depends on the size of the display unit 11. The space area Z is an area rotatable from the position where the display surface 11a is oriented toward the occupant 7 seated in the driver seat 2 and the position where the display surface 11a is oriented toward the occupant 3 seated in the front passenger seat 3. In the display surface 11a is displayed map information from the navigation unit 27, image information from the DVD unit 26, or image information from the TV receiver 25, depending on switching of the selector switch 28.

The rotary plate 19 is rotated as driven by the motor for rotation 22a, which changes the orientation of the display surface 11a of the display means 11. For example, as shown in FIG. 1, the orientation of the display surface 11a is changed, to a position where mainly the occupant 7 in the driver seat 2 can recognize the display surface 11a, that is, a first position A where the direction X perpendicular to the center axis Y of the display surface 11a is directed to the driver seat 2, to a position where mainly the occupant 7 in the driver seat 2 and the occupant 8 in the front passenger seat 3 can recognize the display surface 11a, that is, a second position B where the direction X perpendicular to the center axis Y of the display surface 11a is directed to the middle position between the driver seat 2 and the front passenger seat 3, or to a position where mainly the occupant 8 in the front passenger seat 3 can recognize the display surface 11a, that is, a third position C where the direction X perpendicular to the center axis Y of the display surface 11a is directed to the front passenger seat 3.

Operation of the drive unit 23 is controlled by the controller 14. That is, in a memory 32 (shown in FIG. 3) of the controller 14 are preset drive conditions for driving the display unit 11 to the first position A, second position B or third position C. Depending on the seating position of the occupants 7, 8, the drive conditions are issued to control the drive unit 23.

An example of the drive conditions preset in the memory 23 of the controller 14 will be described using Table 1. As shown in Table 1, the number of rotations of the motor for rotation 22a and its rotating direction are specified in accordance with the current position of the display unit 11 and the position to which the display unit 11 will be oriented as determined by the seating position of the occupants 7, 8.

TABLE 1

| Current position of the display unit | Position the display unit will be oriented to | Number of rotations of the motor for rotation | Rotating direction of the motor for rotation |
| --- | --- | --- | --- |
| First positon A | Second position B | aaa | Positive |
|  | Third position C | bbb | Positive |
| Second position B | First position A | aaa | Negative |
|  | Third position C | ccc | Positive |
| Third position C | Third position C | ccc | Negative |
|  | First position A | bbb | Negative |

For example, in case the current position of the display unit 11 is in the first position A (position where mainly the occupant 7 in the driver seat 2 can recognize the display surface 11a) and the seat occupation sensor 29, 30 have detected that the occupants 7 and 8 are seated in both the driver seat 2 and the front passenger seat 3, the controller issues the drive conditions in the uppermost row of Table 1 and controls the drive unit 23 to set the rotating direction of the motor for rotation 22a to "positive" direction and the number of rotations to "aaa". Other drive conditions in Table 1 are also issued the same as the uppermost row. Depending on the current position of the display unit 11 and the position the display unit 11 will be oriented to as determined by the seating position of the occupants 7, 8 of the vehicle 1, the drive unit 23 is controlled to drive the display unit 11.

The current position of the display unit 11 in Table 1 is detected, for example, by providing a switch on the driver's sear which is turned on when the display unit 11 is in the first position A and a switch on the front passenger seat that is turned on when the display unit 11 is in the third position C on the pedestal 17 and by checking on/off of these switches. Table 2 shows the relationship between the current position of the display unit 11 and on/off of these switches.

TABLE 2

| Switch on the driver seat | Switch on the front passenger seat | Motor for rotation | Current position of the display unit |
|---|---|---|---|
| On | Off | Halted | First position A |
| Off | Off | Halted | Second position B |
| Off | On | Halted | Third position C |
| Off | Off | In rotation | In rotation |

For example, in case the switch on the driver seat is on, the switch on the front passenger seat is off, and the detected operation state of the motor for rotation 22a is halted, it is detected that the current position of the display unit 11 is the first position A (uppermost row of Table 2).

In case the switch on the driver seat is off, the switch on the front passenger seat is on, and the motor for rotation 22a is halted, it is detected that the current position of the display unit 11 is the third position C (third row from top of Table 2). The state the display unit 11 is in the second position B is determined by detecting that both the switch on the driver seat and the switch on the front passenger seat are turned off and the motor for rotation 22a is halted. The state the display unit 11 is in rotation is determined by detecting the operating state of the motor for rotation 22a.

Figure 3:
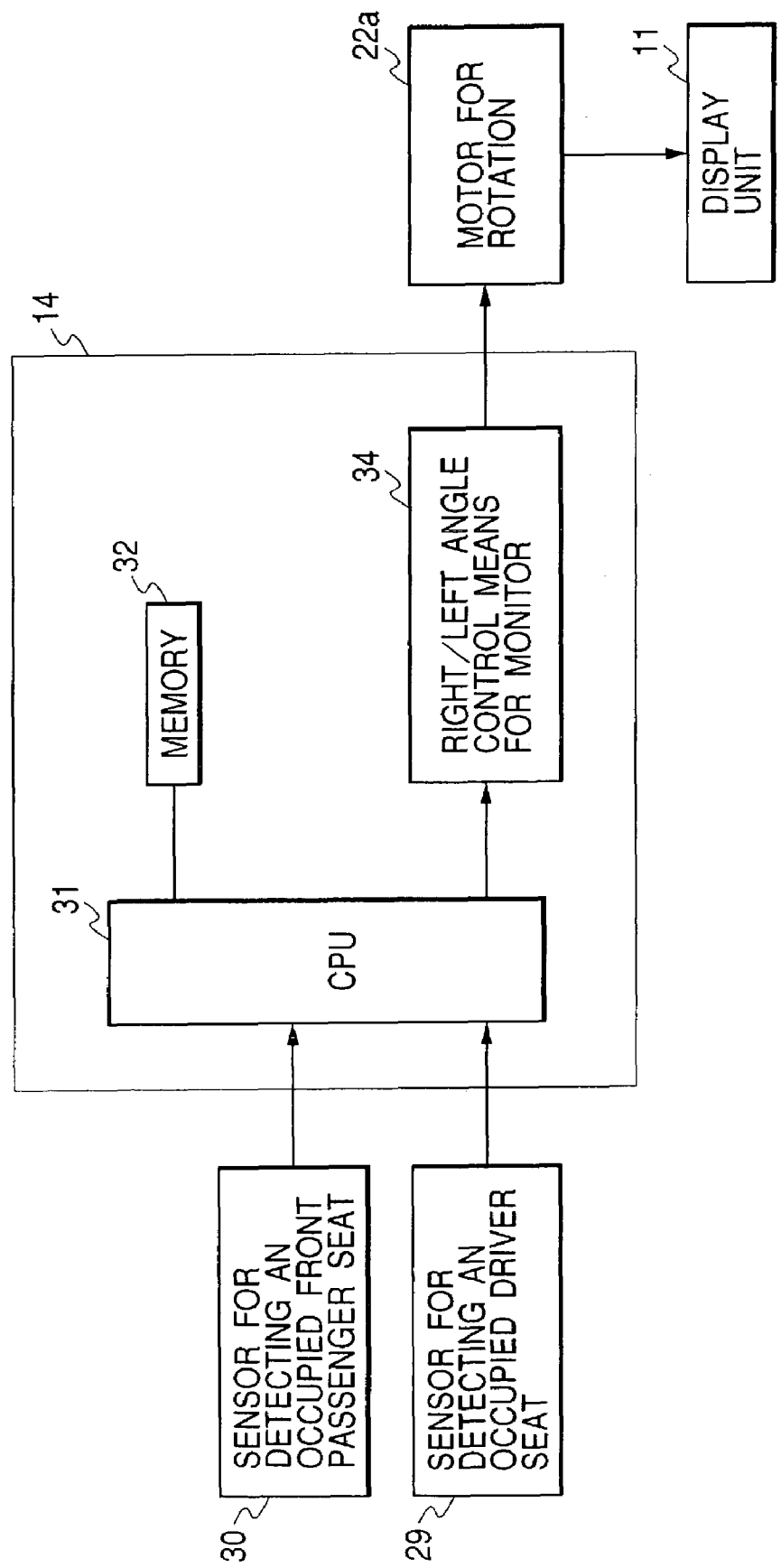
FIG. 3 is a block diagram showing the controller in the embodiment.

Configuration of the display unit 14 in this embodiment will be described referring to FIG. 3. As shown in FIG. 3, the controller 14 comprises a Central Processing Unit (CPU) 31 as a computer, a memory 32, a steering wheel position determination means 33, and right/left angle control means 34 for controlling the motor for rotation 22a.

The CPU 31 recognizes the seating position of the occupants 7, 8 of the vehicle 1 based on signals from the sensor 29 for detecting an occupied driver seat and a sensor 30 for detecting an occupied front passenger seat. The CPU 31 recognizes the current position of the display unit 11 based on the on/off state of the switch on the driver seat and the switch on the front passenger seat as well as the operating state of the motor for rotation 22a. Then, the CPU 31 controls the right/left angle control means 34 to drive the display unit 11 based on the current position of the display unit 11 and detection signals from the seat occupation detecting sensors 29, 30.

The memory 32 is a RAM (Random Access Memory) and stores data indicating the drive conditions and data indicating the current position of the display unit 11. The data indicating the current position of the display unit 11 is sequentially updated by the CPU 31 to the latest data depending on the on/off state of the switch on the driver seat and the switch on the front passenger seat as well as the operating state of the motor for rotation 22a.

The right/left angle control means 34 performs drive control of the motor for rotation 22a of the drive unit 23 by way of a control signal from CPU 31 that is based on the drive conditions stored in the memory 32.

The controller 14 in this configuration issues drive conditions for the memory 32 based on the detection by the sensor 29 for detecting an occupied driver seat and the sensor 30 for detecting an occupied front passenger seat and controls the drive unit 23 to direct the display unit 11 to the first position A where mainly the occupant 7 in the driver seat 2 can recognize the display surface 11a of the display unit 11, to the second position B where mainly the occupant 7 in the driver seat 2 and the occupant 8 in the front passenger seat 3 can recognize the display surface 11a of the display unit 11, or to the third position C where mainly the occupant 8 in the front passenger seat 3 can recognize the display surface 11a of the display unit 11.

Next, control processing in the controller 14 will be described using the flowchart in FIG. 4.

An accessory switch provided in the vehicle 1 is turned on to supply power from an accessory power source provided in the vehicle 1. The power starts the units such as the display unit 11 and drive unit 23. The controller 14 is capable of control by way of the power supplied from a backup power source. The controller 14 constantly supervises that the accessory switch is turned on (step S1).

Recognizing that the accessory switch is turned on in step s1, the controller 14 recognizes that the display unit 11 and the drive unit 23 have started up.

An occupant that turns on the accessory switch of the vehicle 1 is generally an occupant 7 seated in the driver seat 2. Thus, almost at the same time the power is supplied from the accessory power source and the display unit 11 and the drive unit 23 start up, the sensor 29 for detecting an occupied driver seat detects that the occupant 7 is seated. The controller 14 recognizes that the occupant 7 is seated in the driver seat 2.

Then, the controller 14 determines whether the occupant 8 is seated in the front passenger seat 3 based on the detection by the sensor 30 for detecting an occupied front passenger seat. For example, by detecting that the level of the pressure applied to the clamp sensor, seating of the occupant 8 is determined (step S2).

In case it is determined that the occupant 8 is not seated in the front passenger seat 3, the controller 14 references the data indicating the current position of the display unit 11 stored in the memory 32 as well as issues drive conditions to control the drive unit 23. For example, in case the controller 14 has recognized that the current position of the display unit 11 is the third position C in FIG. 1, the controller 14 issues the drive conditions in the lowermost row of table 1 to control the drive unit 23 (motor for rotation 22a). The display unit 11 is placed in the first position A in FIG. 1 and its display surface 11a is oriented to the position where mainly the occupant 7 seated in the driver seat 2 can recognize the display surface 11a (step S3).

In case it is determined that the occupant 8 is seated in the front passenger seat 3 in step S2, it is determined whether the occupant 7 is still seated in the driver seat 2. This assumes that the occupant 7 seated in the driver seat 2 when the accessory switch is turned on has gotten off the vehicle. That is, even when the vehicle 1 is halted, the occupant 7 seated in the driver seat 2 when the accessory switch is turned on could get off the vehicle, and it is determined once whether the occupant 7 is seated in the driver seat 2 (step S4).

In case it is determined that the occupant 7 is still seated in the driver seat 2 in step S4, the controller 14 references the data indicating the current position of the display unit 11 stored in the memory 32 as well as issues drive conditions to control the drive unit 23. For example, in case the controller 14 has recognized that the current position of the display unit 11 is the third position C in FIG. 1, the controller 14 issues the drive conditions in the fifth row from top of Table 1 to control the drive unit 23 (motor for rotation 22a). The display unit 11 is placed in the second position B in FIG. 1 and its display surface 11a is oriented to the position where mainly the occupant 7 seated in the driver seat 2 and the occupant 8 seated in the front passenger seat 3 can recognize the display surface 11a (step S5).

In case it is determined that the occupant 7 is not seated in the driver seat 2 as detected by the sensor 29 for detecting an occupied driver seat in step S4, for example in case the level of the pressure applied to the pressure sensor has restored below a predetermined level, the controller 14 references the data indicating the current position of the display unit 11 stored in the memory 32 as well as issues drive conditions to control the drive unit 23. For example, in case the controller 14 has recognized that the current position of the display unit 11 is the second position B in FIG. 1, the controller 14 issues the drive conditions in the fourth row from top of Table 1 to control the drive unit 23 (motor for rotation 22a). The display unit 11 is placed in the third position C in FIG. 1 and its display surface 11a is oriented to the position where mainly the occupant 8 seated in the front passenger seat 3 can recognize the display surface 11a (step S6).

In this way, it is possible to detect the seating position(s) of one or a plurality of occupants 7, 8 of the vehicle 1 and perform drive control of the display unit 11 so as to orient the display surface 11a of the display unit 11 toward to position favorable to the occupants 7, 8.

The aforementioned embodiment has the following operation and effect.

The CPU 31 of the controller 14 performs drive control of the motor for rotation 22a of the drive unit 23 so as to orient the display surface 11a of the display unit 11 toward the occupants 7, 8 in accordance with the seating of the occupants 7, 8 in the driver seat 2 and front passenger seat 3 of the vehicle 1 detected by the sensor 29 and the sensor 30. That is, on recognizing the detection by the sensor 29 with regard to the seating of the occupant 7 in the driver seat 2 and the detection by the sensor 30 with regard to the seating of the occupant 8 in the front passenger seat 3, the CPU 31 controls the motor for rotation 22a to move the display surface 11a of the display unit 11 to the second position B in FIG. 1 where the display surface 11a is oriented toward the middle position between the driver seat 2 and the front passenger seat 3. On recognizing that the occupant 7 is seated solely in the driver seat 2, the CPU 31 controls the motor for rotation 22a to move the display surface 11a of the display unit 11 to the first position A in FIG. 1 where the display surface 11a is oriented toward the driver seat 2. On recognizing that the occupant 8 is seated solely in the front passenger seat 3, the CPU 31 controls the motor for rotation 22a to move the display surface 11a of the display unit 11 to the third position C in FIG. 1 where the display surface 11a is oriented toward the front passenger seat 3. This skips the operation of changing the orientation of the display surface 11a of the display unit 11 for use of the display unit 11. It is possible to automatically change the orientation of the display surface 11a of the display unit 11 in accordance with whether the occupant 7 is seated in the driver seat 2, the occupant 8 is seated in the front passenger seat 3 or both are seated in the driver seat 2 and front passenger seat 3, respectively thereby promising easy handling and upgraded convenience.

By using the sensor 29 for detecting an occupied driver seat arranged on the driver seat 2 for detecting that the occupant 7 is seated in the driver seat 2, and the sensor 30 for detecting an occupied front passenger seat arranged on the front passenger seat 3 for detecting that the occupant 8 is seated in the front passenger seat 3, it is possible to detect the seating position(s) of the occupant 7 in the driver seat 2 and the occupant 8 in the front passenger seat 3. For example, by using a simple configuration such as a pressure-sensitive sensor as a pair of pressure sensors, it is it is possible to detect the seating position(s) of the occupant 7 in the driver seat 2 and the occupant 8 in the front passenger seat 3.

Further, the CPU 31 of the controller 14 recognizes the current position of the display unit 11 and performs drive control of the motor for rotation 22a from its current position detected by the sensor 29, 30 for detecting occupied seats by reading the drive conditions to control the motor for rotation 22a stored in advance in the memory 32 shown in Table 1, the drive conditions corresponding to the first position A in FIG. 1 where the display surface 11a of the display unit 11 is oriented toward the driver seat 2, the third position C in FIG. 1 where the display surface 11a is oriented toward the front passenger seat 3, or the second position B in FIG. 1 where the display surface 11a is oriented toward the middle position between the driver seat 2 and the front passenger seat 3, thereby moving the display unit 11 to a predetermined position. This makes it easy to automatically orient the display surface 11a of the display unit 11 in accordance with the seating position(s) of the occupants 7, 8 with a simple configuration.

The invention is not limited to the aforementioned embodiment but another configuration or procedure is allowed as long as the object of the invention is attained.

According to the invention, drive means is controlled to orient the display surface of a display unit toward the occupant (s) in accordance with the seating position(s) of one or a plurality of occupants detected by seating position detecting means. This skips the operation of changing the orientation of the display surface of the display unit for use of the display unit, thereby promising easy handling and upgraded convenience.

What is claimed is:

1. A drive controller, comprising:
   a display, mounted on a vehicle, having a display surface;
   a drive device being capable of driving the display to a first position, a second position and a third position to change the orientation of the display surface;
   a seating position detector for detecting seating position of one or more occupants aboard the vehicle; and
   a controller for controlling the drive device so as to orient the display surface toward one of the first, second and third positions in accordance with the seating position of the one or more occupants, the first position where the display surface is oriented toward a first occupant, the second position where the display surface is oriented toward a plurality of occupants, the third position where the display surface is oriented toward a second occupant seated at a different position from the first occupant.

2. The drive controller according to claim 1, wherein the drive device is capable of driving the display to the first position, the second position and the third position, the first position where the display surface is oriented toward the occupant seated in the driver seat, the second position where the display surface is oriented toward both of the occupants seated in the driver seat and a front passenger seat, the third position where the display surface is oriented toward the occupant seated in the front passenger seat.

3. The drive controller according to claim 2, wherein the controller controls the drive device to drive the display to the first position when the seating position detector detects seating of the occupant in the driver seat and does not detect seating of the occupant in the front passenger seat;

the controller controls the drive device to drive the display to the second position when the seating position detector detects seating of the occupants both in the driver seat and in the front passenger seat; and the controller controls the drive device to drive the display to the third position when seating position detector detects seating of the occupant in the front passenger seat and does not detect seating of the occupant in the driver seat.

4. A control method for controlling an orientation of a display surface of a display, comprising:

detecting the seating position of one or more occupants aboard the vehicle; and controlling the orientation of a display surface of a display so as to orient the display surface towards one occupant when only one seating position is detected during the detecting and towards a plurality of occupants when a plurality of seating positions are detected during the detecting.

* * * * *